United States Patent
Zhuge et al.

(10) Patent No.: US 9,317,044 B2
(45) Date of Patent: Apr. 19, 2016

(54) MECHANICAL VIBRATION SYSTEM AND CONTROL METHOD WITH LIMITED DISPLACEMENT

(71) Applicant: Crystal Instruments Corporation, Santa Clara, CA (US)

(72) Inventors: James Qi Zhuge, Palo Alto, CA (US); Andrew P. Snyder, Santa Clara, CA (US)

(73) Assignee: Crystal Instruments Corporation, Santa Clara, CA (US)

( * ) Notice: Subject to any disclaimer, the term of this patent is extended or adjusted under 35 U.S.C. 154(b) by 592 days.

(21) Appl. No.: 13/670,665

(22) Filed: Nov. 7, 2012

(65) Prior Publication Data

US 2014/0129030 A1    May 8, 2014

(51) Int. Cl.
   *G05D 19/02* (2006.01)

(52) U.S. Cl.
   CPC .................................... *G05D 19/02* (2013.01)

(58) Field of Classification Search
   None
   See application file for complete search history.

(56) References Cited

U.S. PATENT DOCUMENTS

| | | | |
|---|---|---|---|
| 4,049,997 A | 9/1977 | McGhee | |
| 4,181,027 A | 1/1980 | Talbott, Jr. | |
| 4,516,230 A | 5/1985 | Goodloe et al. | |
| 4,537,076 A * | 8/1985 | Lax et al. | 73/662 |
| 4,989,158 A | 1/1991 | Sloane | |
| 5,233,540 A | 8/1993 | Andersson et al. | |
| 5,245,552 A | 9/1993 | Andersson et al. | |
| 5,388,056 A | 2/1995 | Horiuchi et al. | |
| 5,767,406 A | 6/1998 | Hu | |
| 6,189,385 B1 | 2/2001 | Horiuchi et al. | |
| 6,341,258 B1 | 1/2002 | Inoue et al. | |
| 6,422,083 B1 | 7/2002 | Hobbs | |
| 6,598,480 B2 | 7/2003 | Horiuchi et al. | |
| 6,752,019 B2 | 6/2004 | Horiuchi et al. | |
| 7,114,394 B2 | 10/2006 | Fukuyama et al. | |
| 7,134,344 B2 | 11/2006 | Kurt-Elli | |
| 7,372,966 B2 | 5/2008 | Bright | |
| 2007/0185620 A1 * | 8/2007 | Van Baren | 700/280 |
| 2010/0305886 A1 | 12/2010 | Zhuge | |

OTHER PUBLICATIONS

Mark H. Richardson, "Measurement and Analysis of the Dynamics of Mechanical Structures", Hewlett-Packard Conference for Automotive and Related Industries, Detroit, MI, Oct. 1978, pp. 1-46.*

* cited by examiner

*Primary Examiner* — Kidest Bahta
*Assistant Examiner* — Saad M Kabir
(74) *Attorney, Agent, or Firm* — Thomas Schneck

(57) ABSTRACT

A control method for a mechanical vibration system independently modifies the higher and lower frequency components of the drive signal satisfying a target profile in a manner that limits displacement in the driven vibration. In particular, phases of the lower frequency components in a preliminary drive spectrum are independently adjusted so that peaks of the respective components are non-simultaneous and distributed in time to avoid contributing constructively. For example, the lower frequency components may be applied as a filter to a narrow-band time waveform, such as one with a swept frequency, to obtain the lower-frequency time waveform. The higher frequency components are randomized in their phase, transformed into the time domain, and recombined with the lower frequency part to obtain the drive signal.

9 Claims, 1 Drawing Sheet

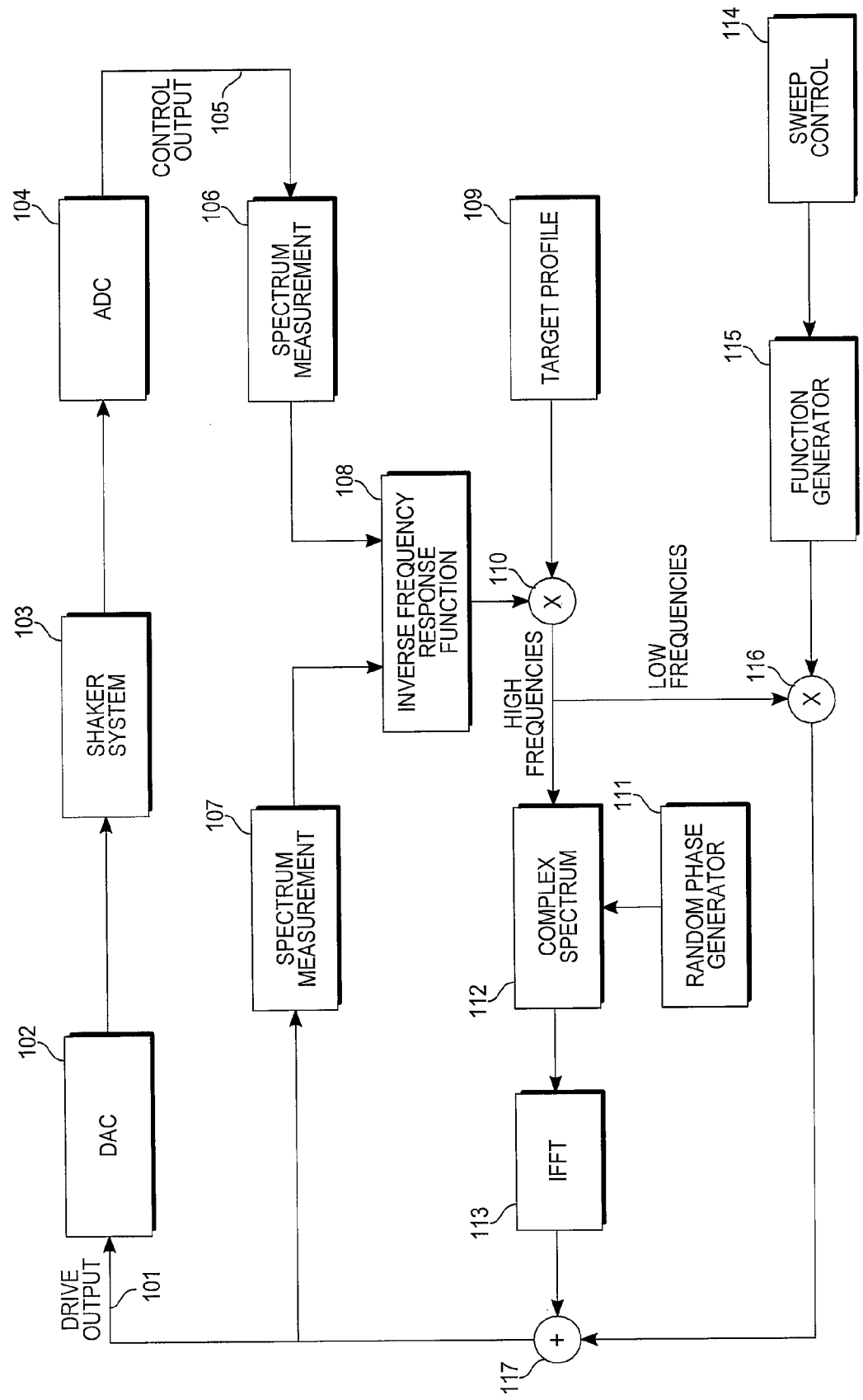

MECHANICAL VIBRATION SYSTEM AND CONTROL METHOD WITH LIMITED DISPLACEMENT

TECHNICAL FIELD

The present invention relates generally to systems and methods for generating and controlling mechanical vibration, and more specifically, providing electronic control of a mechanical actuator or shaker by producing a waveform of random character such that measurements taken of the vibration response match pre-defined characteristics.

BACKGROUND ART

Vibration generation is a common means by which products are tested in their development and manufacturing stages. Most products will encounter some form of environmental vibration throughout their lifecycle; vibration testing is used to ensure product integrity in anticipation of these vibrations that may be present, for example, during transportation and in-service use. Any given product will likely be subject to a variety of vibration environments. If a device is mounted in an automobile, for example, then it will have to withstand vibration from driving on various road and terrain surfaces. It is rarely possible to test products in their in-situ environments, so these environments must be simulated with mechanical test systems. A common method of this simulation is with a Random Vibration Test System, which generates a random vibration with a frequency content tailored to match the expected frequency content of the anticipated real-world environment.

A Random Vibration Test System uses a shaker, which is a mechanical actuator that produces physical forces that are transmitted to a device under test. The shaker is controlled by a vibration controller, which generates an electrical signal that drives the shaker. The controller receives input from sensors that allow it to measure the physical response of the system. The controller uses this feedback to adjust its output so that the physical response meets a pre-defined profile.

The already well-known means by which a shaker generates these forces are varied and not described in this document. However, a limitation that affects all shakers is their displacement capacity, which is the total distance that their moving element can travel. At low frequencies, a much greater displacement is required to achieve a given acceleration amplitude than at high frequencies. The displacement demand increases as the inverse square of the frequency as the frequency decreases for a fixed acceleration.

A shaker system running a random vibration test needs to achieve a certain target, which is usually characterized by an acceleration spectrum that is measured in power spectral density units (PSD). In other words, the target of vibration is usually a curve defined as acceleration vs. frequency. The shaker system must generate this acceleration within its physical limitations.

Limited by the nature of its electrical-mechanical structure, the displacement of a shaker must always remain within a certain range. It becomes more difficult, and adds cost and complexity, to design and build a shaker with a larger displacement capability. For example, while a shaker with 5 mm displacement capacity costs a few thousand dollars, a shaker with 50 mm displacement capacity can cost a few hundred thousand dollars.

Due to the reasons above, if a vibration test can be conducted with a smaller displacement while achieving the same target acceleration PSD, it is a huge advantage. Consequently, controlling or minimizing the displacement of a random control signal will be exceedingly useful.

SUMMARY DISCLOSURE

The above needs are met by methods and apparatus with this present invention, wherein a vibration controller employs a novel method to generate vibration at low frequencies. We have determined that most of the displacement of a random vibration test is caused by the low frequencies of the target profile. Current random vibration control systems do nothing to reduce this displacement at low frequencies. However, as described herein, the present invention can generate low frequency vibration with a significant reduction in displacement demand as compared to a conventional system producing vibration at the same acceleration amplitude.

In one aspect of this invention, a displacement optimized vibration controller provides an excitation random waveform (the "drive signal") to a mechanical actuator. This mechanical actuator, which will be referred to as a shaker system, is any device that converts an input waveform into mechanical motion. This motion is measured in some way and fed back to the controller (the "control signal"). The feedback of the control signal is used to control the characteristics of the drive signal, including its frequency content. The desired frequency content of the control signal (the "target profile") is specified by the operator in advance, as is the desired control signal kurtosis ("target kurtosis").

The target profile is specified for the control signal, not the drive signal. However, the controller has only direct control over the drive signal, and the control signal is a measurement of the mechanical response of the system excited by the actuator. The controller will, through methods described below, calculate the required characteristics of the drive signal to generate a response that matches the target profile.

The vibration controller consists of a random signal generator and a system inverse Frequency Response Function (FRF) calculator. The random signal generator modifies the target profile, usually specified units of Power Spectral Density, in some way to compensate for the non-uniform response of the mechanical system to the drive signal. One method of this modification, used here by way of example and not by way of limitation, involves multiplication with the system inverse Frequency Response Function. Then, random phase values, randomly and uniformly distributed between 0 degrees and 360 degrees, are generated and combined with the modified target profile. Finally an inverse FFT (IFFT) is used to produce a set of samples (a "block") in the time domain. This process is continuously repeated to create a train of blocks that, when combined together, form the continuous drive signal.

The system inverse Frequency Response Function may be calculated in a separate but concurrent process. This process takes a copy of the input control signal and output drive signal and creates averaged frequency measurements from them. The inverse FRF can be derived from these frequency measurements.

The random waveform generation process described in the preceding two paragraphs is widely used in random vibration controllers. The current invention modifies the way the low-frequency components of the waveform are generated. For a test profile that is 2000 Hz wide, the low frequency components may be, for example, the first 10 Hz. The remaining frequency components of the profile are generated in the conventional manner described above.

The low frequency part is generated in a separate but concurrent process, and then combined with the high frequency part to generate the output time waveform. Whereas the conventional method involves generating a waveform that is broadband in nature and has energy spread throughout a broad frequency band, the low frequency generation uses a waveform that has a much narrower frequency band. This narrowband signal is then varied, over time, to cover the entire low frequency range. Because of the nature of this narrowband signal, the resulting total displacement peaks are significantly lower. For example, the lower frequency components of the signal may be adjusted in phase such that peaks of those respective components are non-simultaneous but distributed in time so as to avoid contributing constructively to displacement in the lower frequency part of the waveform.

BRIEF DESCRIPTION OF THE DRAWING

FIG. 1 represents an exemplary embodiment of a random vibration controller with optimization at low frequencies for limiting displacement of a shaker in a vibration system.

DETAILED DESCRIPTION

With reference to FIG. 1, a random vibration controller is implemented on a digital computer or microcontroller, and generates a continuous drive output signal 101 using feedback from a continuous control output signal 105. The drive signal is generated as a stream of digital samples, which is converted into a continuous analog signal by a digital to analog converter (DAC) 102. The analog drive signal is the input to a shaker system 103, which can be any system that produces vibration motion or force from this input. The shaker system measures its response in some way, and produces an output signal. The output signal becomes the digital control signal for the controller after being sampled in an analog to digital converter (ADC) 104.

This control output signal is continually measured for spectral content 106. The spectral measurement usually uses the Fast Fourier Transform (FFT), and may involve additional operations such as applying windowing functions and averaging.

The generated drive output signal is also measured for spectral content 107. The spectrum of both the drive and control signals is then used to calculate the Inverse Frequency Response Function (FRF) of the system 108. One method of calculating this inverse FRF is to divide the Auto Power Spectrum of the drive signal by the Auto Power Spectrum of the control signal on a frequency-by-frequency basis (an Auto Power Spectrum is an average of FFT magnitude values over time). Another method involves dividing the complex Cross-Power Spectrum by the Auto Power Spectrum of the control signal. The Cross-Power Spectrum is derived by multiplying the complex frequency spectrum of the drive signal by the conjugate of the complex frequency spectrum of the control signal on a frequency-by-frequency basis, and averaging the result over time. Those skilled in the art will recognize these as usual and common methods of calculating the FRF, and will recognize that there are other methods of calculating this as well.

The inverse Frequency Response Function (FRF) is then multiplied (110) with the Target Profile 109. The target profile is the desired spectral content of the shaker system response. The FRF describes, mathematically, the response of the system to the output drive system. Rather than generating the Target Profile directly, the FRF serves as a "correction" that takes into account the dynamic behavior of the system. The term "system" in this case refers to everything in between the output and the input, including the DAC; the shaker system that may include amplifiers, actuators, mechanical linkages, test structures, and transducers; and the ADC. Using the system inverse Frequency Response Function for this correction, as described here, is one method of this correction; another method involves using a correction factor derived from the difference between the measured spectrum on the control signal and the desired spectrum.

The result is the drive signal spectrum, which is then split into two parts: the low frequency section and the high frequency section. The low frequency section is chosen as the frequency range that causes the greatest demand in displacement. Both the low frequency and high frequency sections are transformed into time waveforms using different methods that are implemented in two separate processes that occur simultaneously. The resulting individual time waveforms are combined in the final stage of the controller output generator 117.

To generate the time waveform from the high frequency section, the high frequency spectrum is combined with a phase signal 111. Each FFT magnitude value of this drive spectrum is combined with a random phase value. The randomness of these phase values is what gives the generated output its random character. The drive signal spectrum magnitudes combined with phase are converted to a complex spectrum 112 suitable for the inverse Fast Fourier Transform (IFFT) 113. Any of a number of standard techniques commonly used in practice, such as windowing or overlap, may also be applied at this stage.

To generate the low-frequency time waveform, a function generator is used to generate a continuous narrowband time waveform 115. One example of such a waveform is a sine wave, but other waveforms are possible. Characteristics of this waveform, such as its fundamental frequency phase, are varied or swept over time in a controlled manner 114. This variation ensures that the entire low frequency range is filled while achieving a lower displacement demand. Finally, this waveform is filtered and/or scaled (116) so that it conforms to the output drive spectrum.

One particular implementation of this low-frequency waveform generation method uses a sine wave that is continuously swept back and forth through the low frequency range. The amplitude of the sine wave is adjusted to match the output drive spectrum. Although the sine wave only occupies one discrete frequency point in the low frequency range, the average spectral content of the low frequency range will meet the required drive spectrum because of the sweeping.

Another particular implementation of this low frequency waveform generation method uses a number of discrete sine waves with controlled relative phase. These phases are well controlled so that the displacement of the control signal is minimized.

Another particular implementation of this low frequency waveform generation method uses a pseudo random signal which can also reduce the displacement of the control signal.

The frequency band of the low frequency range can be set and selected.

What is claimed is:

1. A method for controlling a vibration-producing device for limited displacement, comprising:
   continuously sensing vibration from the device to obtain a vibration signal in time domain;
   transforming both the vibration signal and a drive signal into frequency domain to obtain frequency spectra of the respective vibration and drive signals;
   calculating an inverse frequency response function from the frequency spectra of both the vibration and drive signals;

adjusting the inverse frequency response function with a target profile that represents a desired spectral content of the vibration from the device so as to obtain a preliminary drive spectrum;

independently modifying higher frequency and lower frequency components of the preliminary drive spectrum, including combining the higher frequency components with components of a randomized phase and converting the randomized signal back into time domain to obtain a higher-frequency time waveform, and modifying the lower frequency components by applying the lower frequency components to a narrowband time waveform having a low frequency range that is swept in time over the lower frequency components then converting the modified lower frequency components into time domain to obtain a lower frequency time waveform;

combining both the higher-frequency and lower-frequency time waveforms together to obtain the drive signal; and applying the drive signal to the vibration-producing device.

2. The method as in claim 1, wherein transforming both the vibration signal and the drive signal into frequency domain comprises applying a Fast Fourier Transform to the respective signals in time domain.

3. The method as in claim 2, wherein transforming into frequency domain further comprises applying a windowing function and averaging the resulting spectra over time.

4. The method as in claim 1, wherein calculating an inverse frequency response function comprises dividing an auto power spectrum of the drive signal by an auto power spectrum of the vibration signal on a frequency-by-frequency basis to obtain an inverse frequency response function of the vibration signal.

5. The method as in claim 1, wherein calculating an inverse frequency response function comprises multiplying a complex frequency spectrum of the drive signal by a conjugate of a complex frequency spectrum of the vibration signal on a frequency-by-frequency basis and averaging over time to obtain a complex cross-power spectrum, then dividing the complex cross-power spectrum by an auto power spectrum of the vibration signal on a frequency-by-frequency basis.

6. The method as in claim 1, wherein adjusting the inverse frequency response function comprises multiplying the inverse frequency response function with the target profile on a frequency-by-frequency basis.

7. The method as in claim 1, wherein modifying the higher frequency components of the preliminary drive spectrum comprises combining the higher frequency components with a randomized phase to obtain the complex spectrum then applying an Inverse Fast Fourier Transform to the complex spectrum to convert the complex spectrum back into time domain and obtain the higher-frequency time waveform containing randomized higher frequency components.

8. The method as in claim 1, wherein combining the higher-frequency and lower-frequency time waveforms comprises adding amplitudes of the time waveforms to obtain the drive signal.

9. A vibration system for producing randomized mechanical oscillations with limited displacement, comprising:

a vibration generator driven by an analog drive signal;

at least one vibration-sensing transducer for continuously producing an output signal representative of mechanical oscillations from the vibration generator;

an analog-to-digital converter coupled to the sensing means to convert the output signal into a digital control signal;

a computer data processor coupled to the analog-to-digital converter to receive the digital control signal and programmed with stored routines so as to operate upon the control signal to generate a digital drive output computed to produce randomized mechanical oscillations from the vibration generator such that the randomized mechanical oscillations are characterized by having a specified frequency spectrum and an amplitude distribution, the computing of the digital drive output carried out by the computer data processor including steps of;

(a) transforming both the digital control signal and a digital drive signal into frequency domain to obtain frequency spectra of the respective control and drive signals, (b) calculating an inverse frequency response function from the frequency spectra of both the vibration and drive signals, (c) adjusting the inverse frequency response function with a target profile that represents a desired spectral content of the vibration from the device so as to obtain a preliminary drive spectrum, (d) independently modifying higher frequency and lower frequency components of the preliminary drive spectrum, including combining the higher frequency components with components of a randomized phase and converting the randomized signal back into time domain to obtain a higher-frequency time waveform, and modifying the lower frequency components by applying the lower frequency components to a narrowband time waveform having a low frequency range that is swept in time over the lower frequency components then converting the modified lower frequency components into time domain to obtain a lower frequency time waveform, and (e) combining both the higher-frequency and lower-frequency time waveforms together to obtain the digital drive signal; and a digital-to-analog converter coupled to the computer data processor to convert the digital drive signal into the analog drive signal that drives the vibration generator.

* * * * *